UNITED STATES PATENT OFFICE 1,998,524

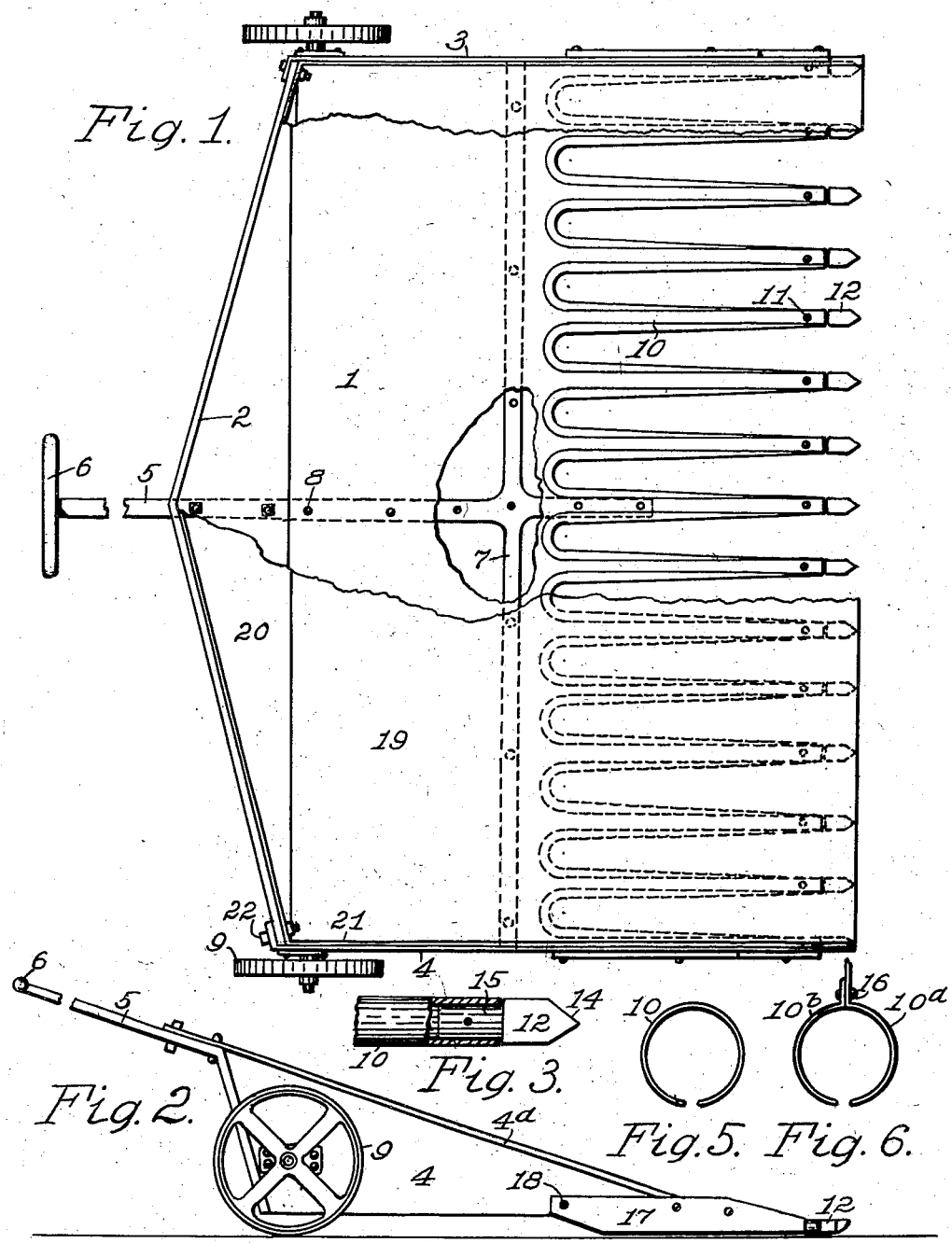

LITTER GATHERER

Homer A. Roquet, Oskaloosa, Iowa

Application April 2, 1934, Serial No. 718,534

6 Claims. (Cl. 37—121)

My invention relates to improvements in litter gatherers, and one object of my improvements is to supply a device of this class which is mounted for transportation and constructed in a simple inexpensive manner, particularly for manual propulsion and use in the gathering of litter, such as cut grass, fallen leaves, or rubbish of any character, and for delivery thereof to a place of deposit, and for dumping its load there.

Another object of my improvements is to furnish an improved type of gathering teeth removably secured to the terminations of the tines of the device for use in the gathering of rubbish.

Another object of my improvements is to combine with the above device an additional member for covering the tray and tines thereof when it is desired to gather loose soil or the like upon the tray, so as to prevent escape of the gathered material, such as might happen were this kind of material gathered by the device without such a covering, that is, when the consistency of the material is such that it might fall between the tines.

Another object of my improvements is to make and shape the tines of the gathering tray as hollowed members suitable to receive the aforesaid gathering teeth, which are formed to be fitted in said members, and removably secured thereto.

All of these objects I have accomplished by the means which are hereinafter described and claimed, and which are illustrated in the accompanying drawing, in which Fig. 1 is a top plan of my improved litter gatherer, as equipped with the additional imperforate apron or covering device, parts of which as also of the tray itself are shown broken away to better disclose the constructions. Fig. 2 is a side elevation of the invention. Fig. 3 is an enlarged top plan of one of the gathering teeth as removably mounted in and projecting from a hollow tine of the tray, and with a part of the tine in longitudinal section. Fig. 4 is a side elevation of the members shown in Fig. 3, with a part of the tine in section. Fig. 5 is a front end elevation of the split tube of one tine, and Fig. 6 is a like view of a modification of one of the side tines at its forward end.

The numeral 1 denotes a flat horizontal bed or tray mounted near its rear corners on wheels 9 for transportation, although in some cases such wheels may be dispensed with. The tray 1 has a rear inclined wall 2 and vertical straight side walls 3 and 4, but is open at the front where it is cut and shaped to furnish a plurality of spaced split tube tine bodies 10, preferably diminished forwardly. In the forward end of each tine 10 is fitted the stem 15 of a gathering tooth 12 of a novel shape to facilitate its use in gathering material and to travel over the ground with a minimum of interference. The stem is removably secured in its seat by a bolt and nut 11 or by other means, and the tooth 12 has a flat top and a sled runner curve below at 13, the side walls of the tooth being vertical longitudinally for a distance forwardly then truncated obliquely at 14 to provide a pointed forward termination. The tooth has a rear shoulder which engages the forward end of the tine body 10. Each tine body which is laterally outermost is shaped as shown in Fig. 6 with a depending semicylindrical wall 10a to which tine body is riveted at 16 a mating reversed part 10b, for convenience in similarly seating a tooth 12. As each tine body 10 is longitudinally split below it has a measure of resiliency which is useful in the proper fitting of the shank 15 of a tooth 12 therein.

As shown in said Fig. 2, a plate 17 is secured by rivets 18 on each of the forward portions of each of the side walls 3 and 4 to project forwardly, thus protecting the forward ends of the tines 10, stiffening the walls, and extending below the bottom of the tray 1 nearly to the ground traversed and also projecting a little above the tines to retain the material there between the side walls while being gathered, or when the apron 19 is being employed.

The tray 1 is reinforced and supported by a cruciform member 7 secured thereto by rivets or otherwise at 8 and its rear arm 5 projects rearwardly beyond the rear wall 2 to which it is bent to fit and thence extends back slopingly to a cross-handle 6. The upper edges of the side walls are preferably bent over laterally in contact therewith to brace and strengthen the walls at 4a.

The numeral 19 denotes an imperforate tray covering or apron which is dimensioned and shaped to fit over the tray 1, and has like rear wall 20 and side walls as at 21 which contact with the rear and side walls of the tray and are secured removably thereto by means of bolt and nut connections 22 or by any other desired fastening means.

The forward margin of this tray 19 covers the teeth 12 when in place or may protrude forwardly therefrom a distance, as the apron is designed for use when thus mounted, to receive such loose and minute materials as would fall between the tines 10 if the tray 1 alone were employed.

The tray 1 may be manually propelled by use of the cross-handle 6, but may be attached to and operated by any other means, and the tray may be tilted forwardly or rearwardly to discharge the gathered materials, according to necessity and the character of the ground traversed.

The teeth 12 easily penetrate masses of grass or hay or other divisible material because of its pointed prow 14, while its sled-runner face 13 permits it to ride over slight obstructions while being otherwise in contact with or slightly spaced above the surface traversed.

I claim:

1. In a gathering device, a receiving tray having a plurality of resilient split tubular tine projections, and teeth mounted in the forward ends of said tine projections and clasped thereby.

2. In a gathering device, a receiving tray open at the front and having rear and side walls, the forward part of the tray being shaped with a plurality of integral split hollow projections spaced apart laterally, teeth having shanks fitted into said projections, and means for securing said teeth removably therein.

3. In a gathering device, a receiving tray having spaced tines projecting forwardly, and having side walls, and side plates mounted on said side walls to basally tread evenly with said tines, and also to project above the forward parts of said side walls.

4. In a gathering device, a receiving tray having forwardly projecting longitudinally split tubular tines, prow-shaped teeth removably secured in said tines, and an apron member removably connected to the tray to cover both it and said tines.

5. In a gathering device, a receiving tray having both rear and side walls and having a plurality of laterally spaced forwardly projecting tines, tread plates mounted alongside said side walls to project therebeyond and tread evenly with the tines, and an apron covering said tray removably including its tines, the apron having both rear and side walls fitting the rear and side walls of the tray.

6. In a gathering device mounted on means for transportation, a tray thereon having spaced longitudinally split resilient tubular forwardly projecting tines with hollow terminations, shouldered teeth secured in and engaged with said terminations to project therefrom having upturned and forwardly diminished ends, and a cover for said tines removably secured to the tray.

HOMER A. ROQUET.